Sept. 22, 1964   H. W. PENMAN   3,150,024
METHOD AND APPARATUS FOR LAMINATING A LAYER OF PLASTIC
AND SCRIM ON THE BACKING OF CARPET
Filed Sept. 20, 1960   6 Sheets-Sheet 1
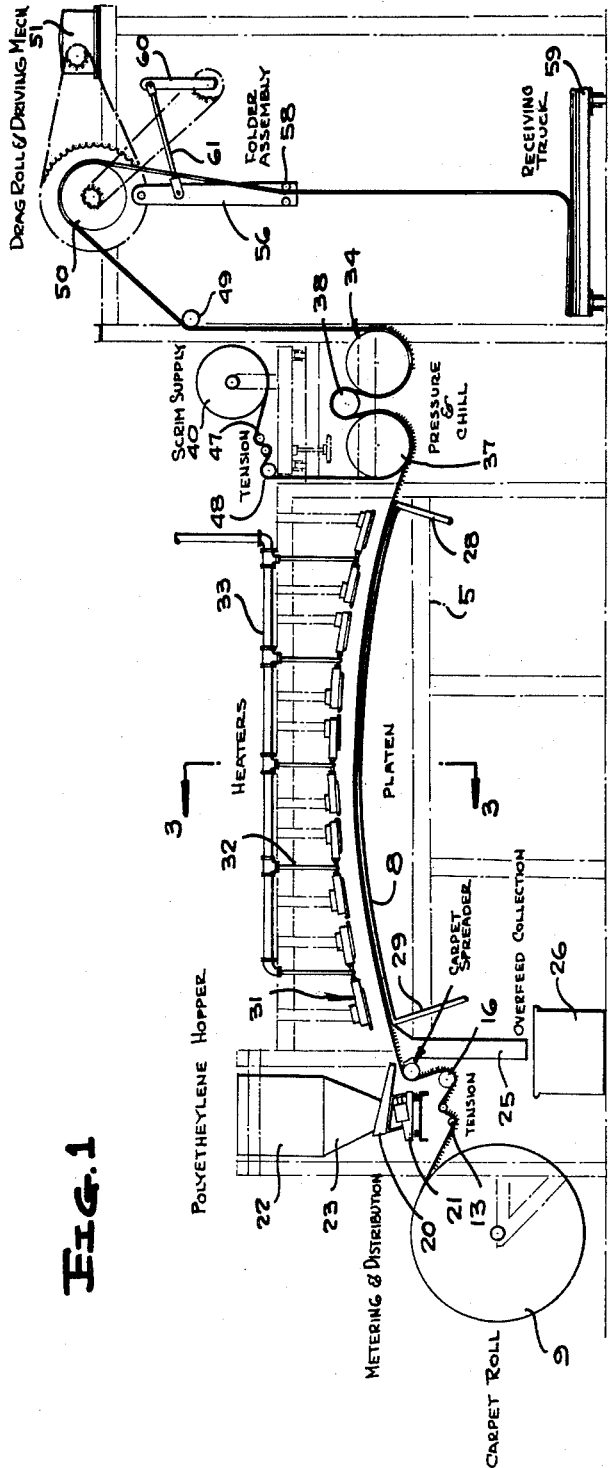
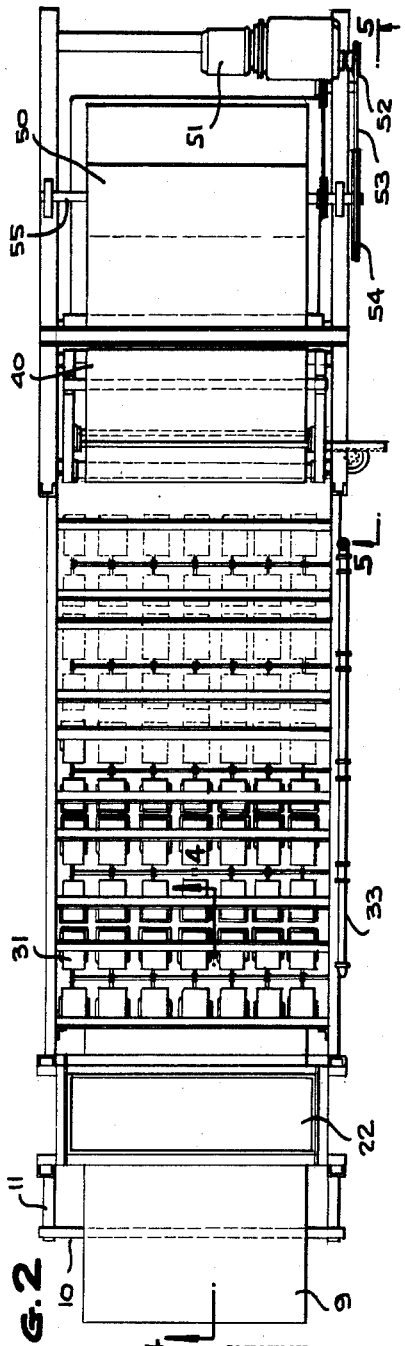
INVENTOR.
HURL W. PENMAN
BY
*Ralph Burch*
ATTORNEY

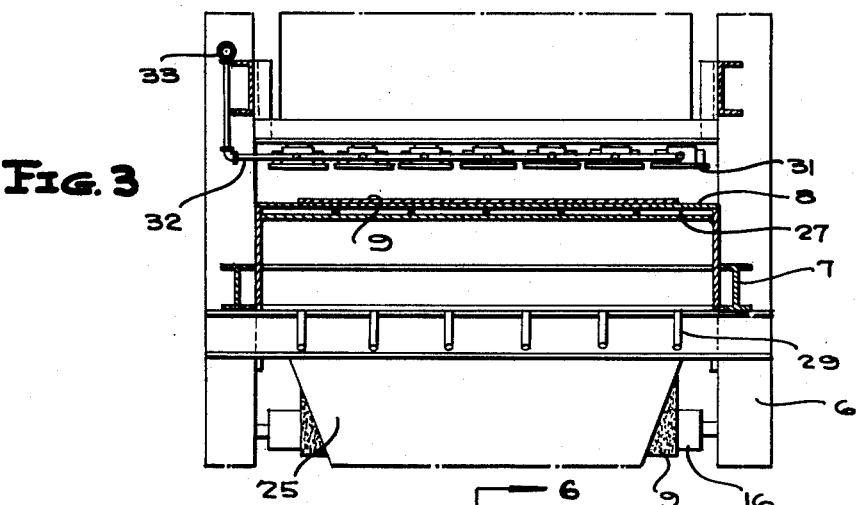
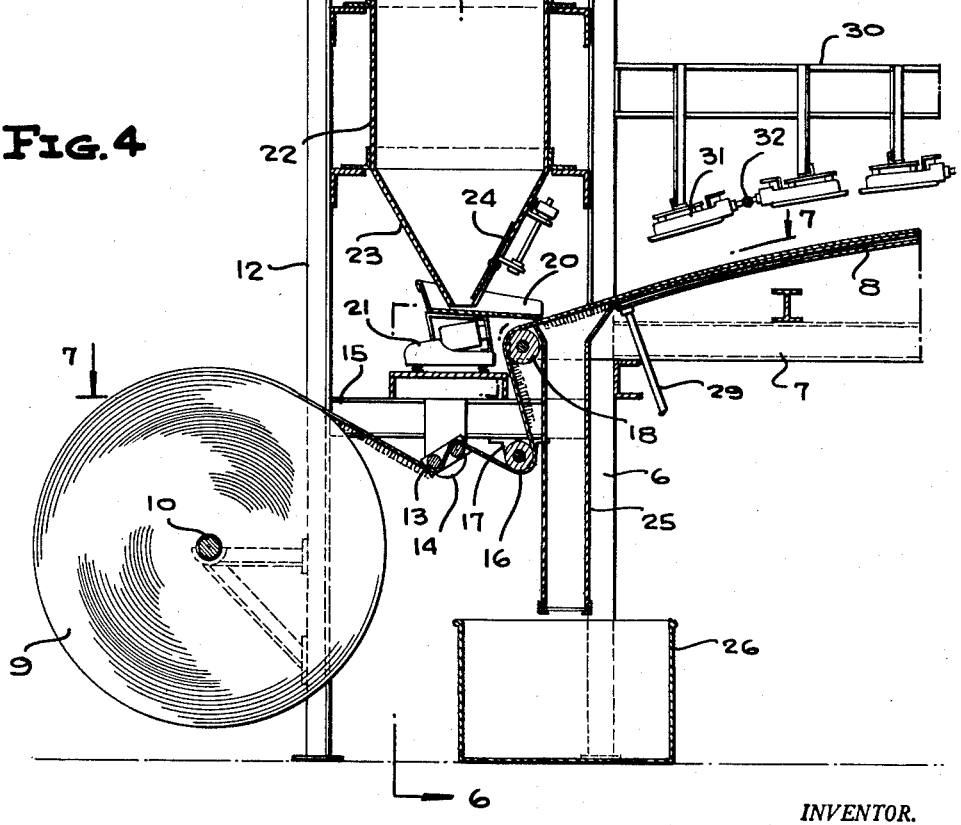

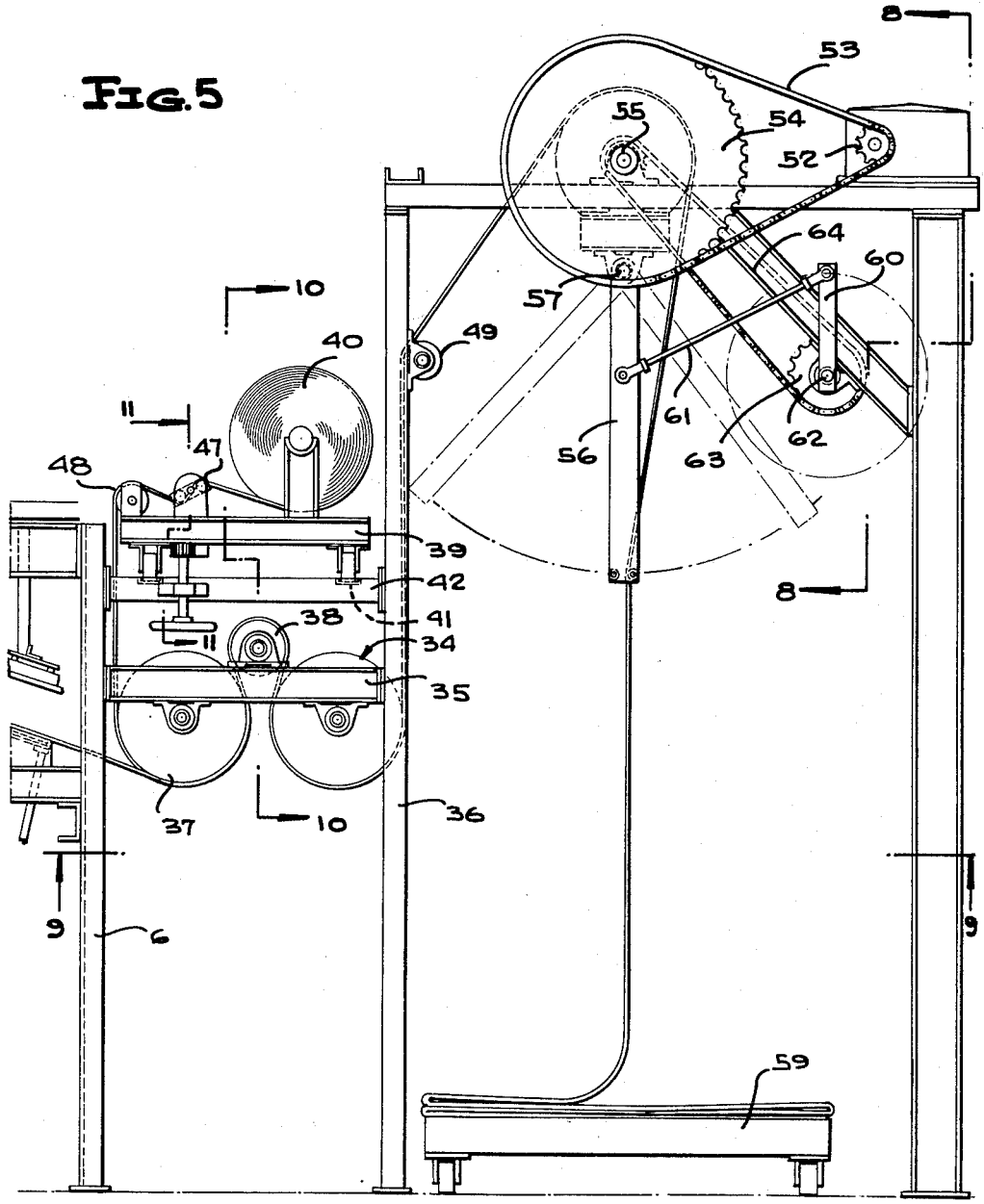

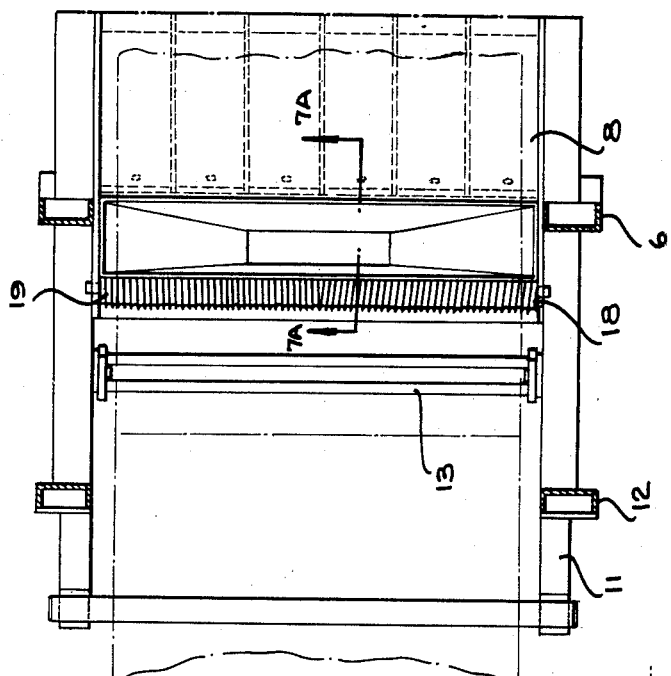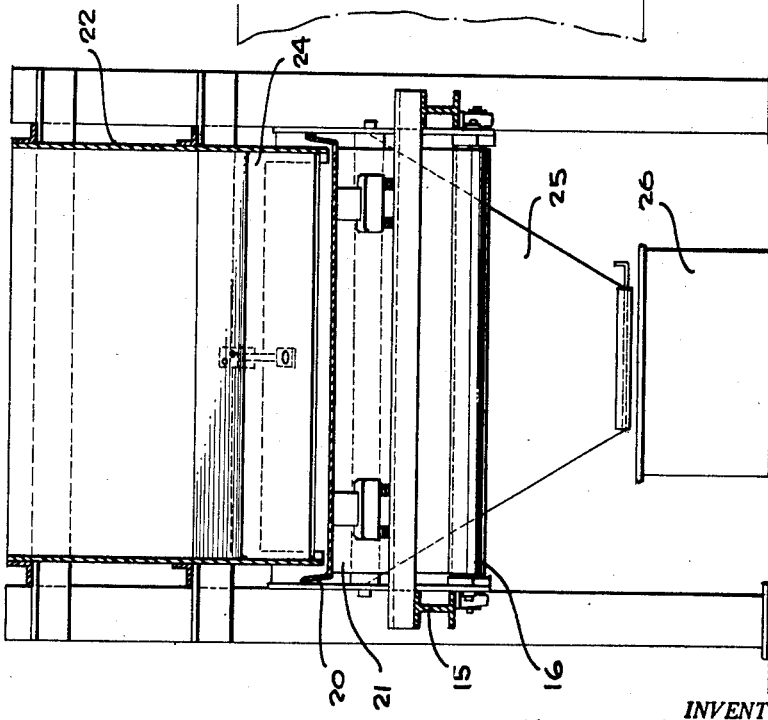

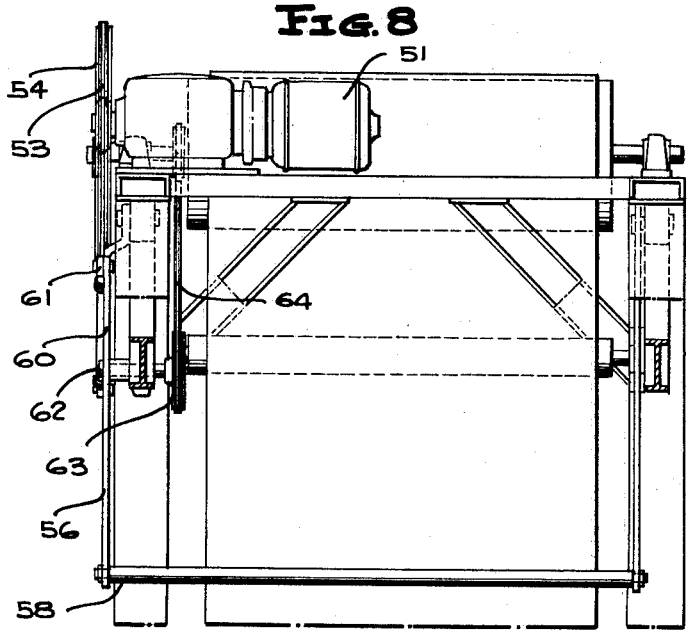
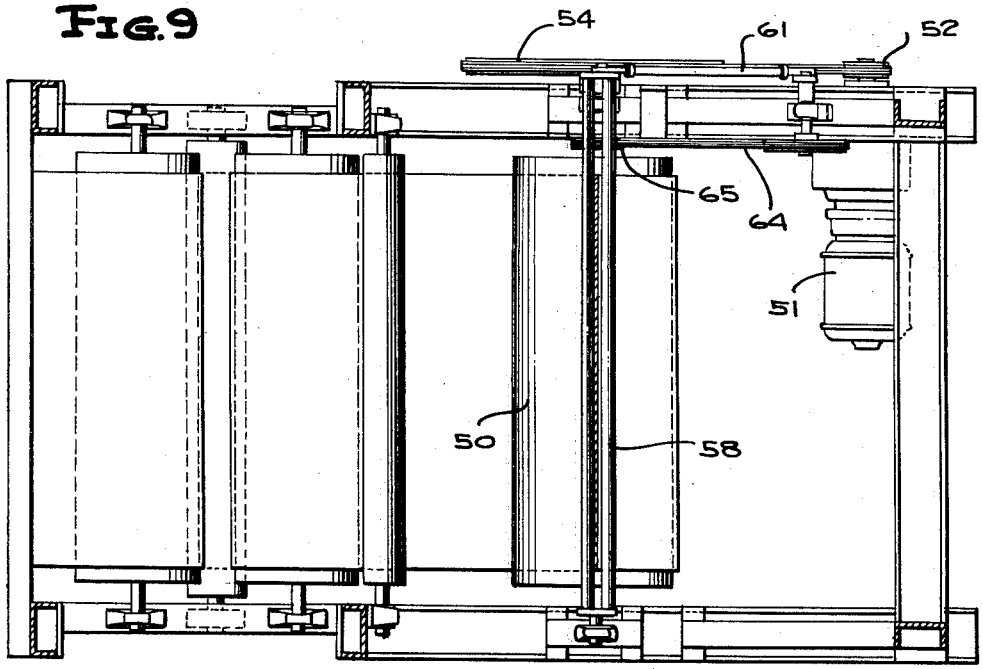

Sept. 22, 1964 H. W. PENMAN 3,150,024
METHOD AND APPARATUS FOR LAMINATING A LAYER OF PLASTIC
AND SCRIM ON THE BACKING OF CARPET
Filed Sept. 20, 1960 6 Sheets-Sheet 6

FIG. 7-A

INVENTOR.
HURL W. PENMAN
BY *Ralph Burch*
ATTORNEY

United States Patent Office 3,150,024
Patented Sept. 22, 1964

3,150,024
METHOD AND APPARATUS FOR LAMINATING A LAYER OF PLASTIC AND SCRIM ON THE BACKING OF CARPET
Hurl W. Penman, Bloomsburg, Pa., assignor to The Magee Carpet Company, Bloomsburg, Pa., a corporation of Pennsylvania
Filed Sept. 20, 1960, Ser. No. 57,291
7 Claims. (Cl. 156—229)

This invention relates to a method and apparatus for laminating a layer of thermoplastic material and a sheet of scrim on the backing of a carpet.

It is an object of the invention to provide a method of simultaneously applying a thermoplastic layer and sheet of scrim to the backing of a carpet.

A further object of the invention resides in applying a thermoplastic powder to the backing of a carpet, heating the powder to form a soft plastic layer, applying a sheet of scrim to the plastic layer and compressing the scrim and plastic layer together while the plastic layer is setting.

A still further object of the invention resides in providing apparatus having means for distributing a uniform layer of thermoplastic powder on the backing a carpet while spreading the carpet in a weftwise direction with means for bending the carpet in a warpwise direction while passing the carpet beneath a heater to fuse the powder to form a sheet of plastic and means for pressing a sheet of scrim on to the sheet of plastic before the plastic sets.

Another object of the invention resides in providing apparatus of the character described which provides a continuous operation, requires little attention and produces a product of high quality.

Other objects and advantages of the invention will be apparent during the course of the following description.

Figure 10:
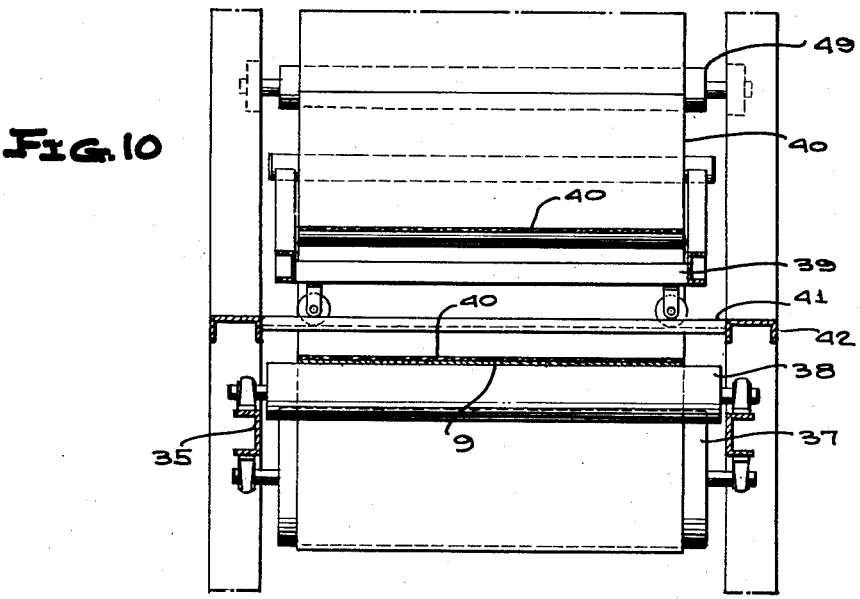
Figure 11:
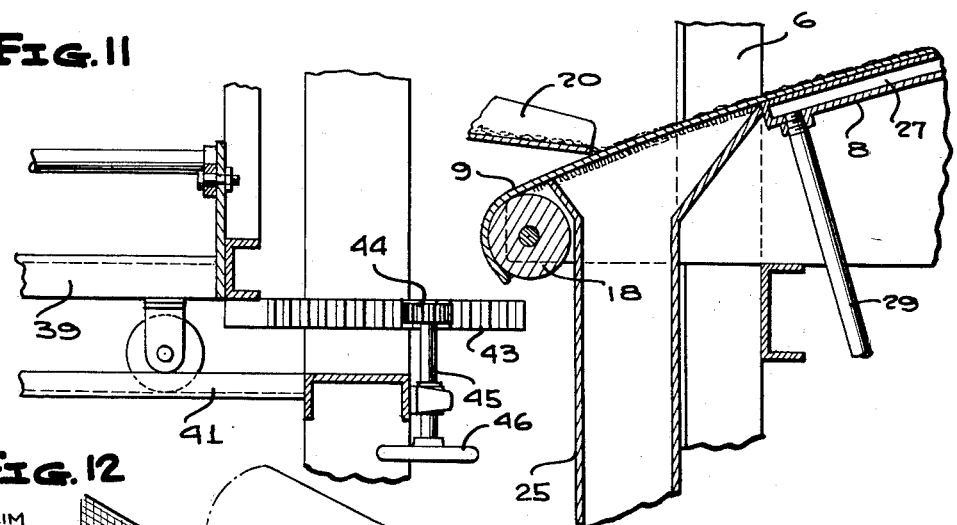
Figure 12:
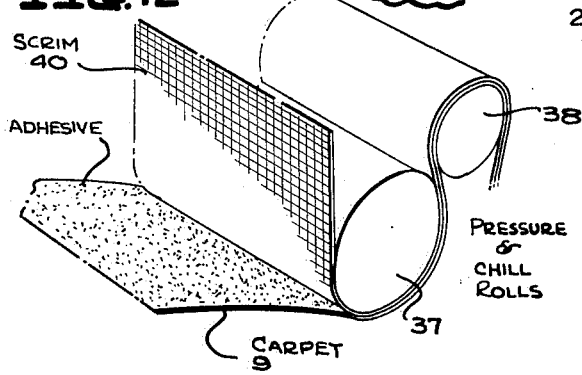

In the accompanying drawings forming a part of this specification and wherein like numerals are employed to designate like parts throughout the same, FIG. 1 is a diagrammatic side elevation view of the apparatus, FIG. 2 is a diagrammatic top plan view of the apparatus, FIG. 3 is a cross sectional view taken on line 3—3 of FIG. 1, FIG. 4 is a longitudinal sectional view taken on line 4—4 of FIG. 2, FIG. 5 is a side elevational view taken on line 5—5 of FIG. 2, FIG. 6 is a vertical section taken on line 6—6 of FIG. 4, FIG. 7 is a sectional view taken on line 7—7 of FIG. 4, FIG. 7A is a section taken on line 7A—7A of FIG. 7, FIG. 8 is a sectional view taken on line 8—8 of FIG. 5, FIG. 9 is a sectional view taken on line 9—9 of FIG. 5, FIG. 10 is a sectional view taken on line 10—10 of FIG. 5, FIG. 11 is a sectional view taken on line 11—11 of FIG. 5, and, FIG. 12 is a fragmentary perspective view showing the layer of scrim being pressed into engagement with the plastic coating on the backing of a carpet.

In the drawings wherein for the purpose of illustration a preferred form of apparatus for carrying out the method is shown, the numeral 5 denotes generally a supporting frame composed of uprights 6 and longitudinal beams 7 for mounting a longitudinally curved or arched platen 8. The roll of carpet 9 is mounted at one end of the frame 5 on a shaft 10 supported by brackets 11 mounted on uprights 12 spaced from the uprights 6 of the frame 5. The carpet passes from the roll between tension rolls 13 rockably mounted in hangers 14 depending from a cross bar 15, and then passes beneath an idler roll 16 mounted in brackets 17 attached to cross bar 15 before passing over a spreader roll 18 mounted above the idler roll 16 transversely of the forward end of the platen 8. The spreader roll 18 is provided with a ribbed surface 19, with the ribs extending in opposite angular directions from the center to the ends of the roller for spreading the carpet in a weftwise direction. Disposed above the spreader roll is a feed chute 20 of a syntron metering device 21 mounted on the cross bar 15 which controls the amount and distribution of a thermoplastic powder, such as polyethylene or other suitable thermoplastic material over the backing of the carpet before the carpet passes along the platen 8. A hopper 22 for holding a supply of thermoplastic powder is mounted above the feed chute 20 having a discharge spout 23 with an adjustable gate 24 for controlling the flow of powder to the feed chute 20. An over feed spout 25 is disposed beneath the discharge end of the feed chute 20 to receive the overflow of powder from the carpet and deposit it in a container 26 for re-use.

The platen 8 is formed of spaced plates defining a cooling chamber 27 extending the length of the platen. A cooling liquid is introduced into the chamber 27 through an inlet pipe 28 and is discharged therefrom through an outlet pipe 29, the inlet and outlet pipes being disposed at opposite ends of the chamber. Mounted above the platen is a heater frame assembly 30 comprising a series of infra-red gas radiant heaters 31 suspended above and in spaced relation to the upper surface of the platen 8 which are disposed to follow the curvature of the platen. The heaters are connected by pipes 32 to a gas supply pipe 33.

After moving over the platen 8 beneath the heaters the carpet passes through a pressure and chill roll assembly 34 mounted on a cross beam 35 between the uprights 6 of the main frame and uprights 36 spaced from the opposite end of the frame. The pressure roll assembly comprises a pair of spaced rolls 37 with a roll of smaller diameter 38 disposed between and above the rolls 37. The carpet is trained beneath one of the rolls 37 and then over the roll 38 before passing beneath the other roll 37.

Mounted above the pressure roll assembly is a wheeled supporting frame 39 for a roll of scrim or other open weave fabric 40 which is adapted to move transversely of the main frame on tracks 41 mounted on beams 42. A rack bar 43 carried by the supporting frame 39 is engaged by a gear wheel 44 mounted on a shaft 45 which is turned by a hand wheel 46 to rotate the gear wheel and thereby reciprocate the rack bar to move the supporting frame 39 to aline the scrim fabric with the carpet. The scrim fabric is trained between tension rolls 47 and then over a guide roll 48 before passing between the pressure roll 37 and the carpet.

After the carpet with the layer of scrim attached leaves the pressure rolls it is trained over a guide roll 49 and a drag roll 50 which is driven by a motor 51 having a sprocket wheel 52 for driving a belt 53 trained around the sprocket wheel 52 and a sprocket wheel 54 mounted on the shaft 55 of the drag roll 50. Suspended beneath the drag roll 50 is a folding mechanism comprising swinging arms 56 pivotally mounted, at 57, and extending between the lower ends of the arms are a pair of spaced rods 58 between which the carpet passes on its way to the receiving pallet or truck 59. The swinging arms 56 are oscillated to form folds in the carpet as it is deposited on the receiving truck by a crank arm 60 connected with one of the swinging arms 56 by a connecting rod 61. The crank arm is mounted on the shaft 62 of a sprocket wheel 63 and a belt 64 is trained around the sprocket wheel 63 and a sprocket wheel 65 mounted on shaft 55 whereby the crank arm is actuated upon rotation of the drag roll.

In operation, rotation of drag roll 50 draws the carpet from roll 9 over spreader roll 18 beneath powder feed chute 20 which by means of the syntron metering device 21 distributes a uniform layer of thermoplastic powder onto the backing of the carpet. The powder is supplied to the feed chute from the hopper 22 mounted above the feed chute. The spreader roll stretches the carpet in a weftwise direction to open the interstices of the woven backing so that some of the powder is deposited therein. The carpet with the layer of powder thereon then moves over the longitudinally curved platen 8 which bends the carpet warpwise as it passes beneath the heaters 31 which fuse the powder to form a soft sheet of plastic material. During the movement of the carpet over the platen the pile surface and backing is kept cool by the cooling fluid in chamber 27 to prevent the heat applied to the backing from injuring the pile or backing and cause color change on the pile. As the carpet with the coating of soft plastic material leaves the platen the scrim or open weave fabric 40 is pressed by pressure rolls 37 into firm engagement with the layer of plastic material which upon being cooled by the pressure rolls bonds the layer of scrim to the backing. After leaving the pressure rolls the carpet is moved by drag roll through the folding mechanism which folds the carpet as it is laid on the receiving truck 59. Thus, it is seen the apparatus serves to apply a thermoplastic sheet to the backing of carpet to hold the pile tufts in the backing and at the same time apply a layer of scrim to the backing which gives the backing the appearance of a woven backing and resists slipping of the carpet when laid on the floor.

Having thus described my invention, I claim:

1. The method of applying a plastic coating to the woven backing of a carpet comprising the steps of drawing a continuous carpet from a source of supply in a warpwise direction with the backing upwardly, spreading the backing in a weftwise direction to enlarge the interstices, distributing a thermoplastic powder over the spread backing, bending the carpet in a warpwise direction to extend the interstices of the backing in a warpwise direction while fusing the powder to form a continuous viscous coating adhering to the backing, and then pressing an open weave fabric upon the coating while the coating is still viscous.

2. The method of applying a plastic coating to the woven backing of a carpet comprising the steps of drawing a continuous carpet from a source of supply in a warpwise direction with the backing upwardly, spreading the backing in a weftwise direction to enlarge the interstices, distributing a thermoplastic powder over the spread backing and bending the carpet in a warpwise direction to extend the interstices in a warpwise direction while fusing the powder to form a continuous viscous coating adhering to the backing.

3. The method of applying a plastic coating to the woven backing of a carpet comprising the steps of drawing a continuous carpet from a source of supply in a warpwise direction with the backing upwardly, distributing a thermoplastic powder over the backing of the carpet and then bending the carpet in a warpwise direction to enlarge the interstices of the backing while simultaneously fusing the powder to form a continuous viscous coating with portions of the coating penetrating the interstices of the backing.

4. Apparatus for applying a plastic coating and sheet of scrim to the woven backing of carpet comprising an arched platen, means for supporting a roll of carpet at one end of said platen, means at the other end of said platen for drawing the carpet along the upper surface of said platen in a warpwise direction with the backing facing upwardly, a spreader roll at the forward end of said platen for spreading the carpet weftwise, a feeder for distributing a thermoplastic powder over the spread backing of the carpet, heaters above said platen for fusing the layer of powder on said backing to form a continuous viscous coating, a cooling chamber beneath said platen, a pressure roll assembly at the rear end of said platen having a series of rolls around which the carpet is trained, means supporting a roll of open weave scrim above said pressure roll assembly, and means for guiding the sheet of scrim into contacting engagement with the viscous coating before the carpet passes through the pressure roll assembly.

5. Apparatus for applying a plastic coating and layer of scrim to the woven backing of a carpet comprising an arched platen over which the carpet is adapted to move in a warpwise direction with the backing facing upwardly, means supporting a roll of carpet adjacent the forward end of said platen, a drag roll adjacent the rear end of said platen, for drawing the carpet over the upper surface of said platen, a feeder for distributing a thermoplastic powder over the backing of the carpet as the carpet starts its movement over the platen, means above said platen for heating and fusing the powder to form a continuous viscous coating adhering to the backing of the carpet, means for delivering a sheet of open weave scrim over the viscous coating as the carpet leaves the platen, and means for pressing the sheet of scrim into bonding engagement with the viscous coating.

6. Apparatus for applying a plastic coating to the woven backing of carpet comprising an arched platen over which the carpet is adapted to move in a warpwise direction with the backing upwardly, means supporting a roll of carpet adjacent the forward end of said platen, a drag roll adjacent the rear end of said platen for drawing the carpet over the upper surface of said platen, means for spreading the carpet in a weftwise direction before moving over said platen, means for distributing a thermoplastic powder on the spread backing to fill the extended interstices of the backing and means above said platen for heating and fusing the powder to form a continuous plastic sheet adhering to the backing of the carpet.

7. Apparatus for applying a plastic coating to the woven backing of carpet comprising means supporting a roll of carpet, means for drawing the carpet from said roll with the backing facing upwardly, a feeder for distributing a thermoplastic powder over the backing of the carpet as if unrolls, an arched platen over which the carpet with the layer of powder thereon is adapted to move in a warpwise direction with the pile of the carpet in contact with the platen, and heaters above said platen throughout its length for fusing the powder to form a continuous viscous coating in bonding engagement with the interstices of the woven backing.

References Cited in the file of this patent

UNITED STATES PATENTS

| | | |
|---|---|---|
| 1,035,266 | Taylor | Aug. 13, 1912 |
| 2,021,095 | Ball | Nov. 12, 1935 |
| 2,055,464 | Bowes | Sept. 29, 1936 |
| 2,115,581 | Johnson | Apr. 26, 1938 |
| 2,434,111 | Hawley et al. | Jan. 6, 1948 |
| 2,491,258 | Fuhrhop et al. | Dec. 13, 1949 |
| 2,641,296 | Marco | June 9, 1953 |
| 2,994,940 | Ferrell et al. | Aug. 8, 1961 |